(12) United States Patent
Youngs et al.

(10) Patent No.: US 8,950,089 B2
(45) Date of Patent: Feb. 10, 2015

(54) HEAT RETENTION AND INSULATION SYSTEM FOR WEARABLE ARTICLES

(75) Inventors: Bryan Youngs, Portland, OR (US);
Blaine Conrad, Portland, OR (US)

(73) Assignee: Keen, Inc., Portland, OR (US)

( * ) Notice: Subject to any disclaimer, the term of this patent is extended or adjusted under 35 U.S.C. 154(b) by 759 days.

(21) Appl. No.: 13/091,073

(22) Filed: Apr. 20, 2011

(65) Prior Publication Data

US 2012/0266492 A1 Oct. 25, 2012

(51) Int. Cl.

| A43B 23/07 | (2006.01) |
| A43B 7/06 | (2006.01) |
| A43B 13/12 | (2006.01) |
| A43B 7/34 | (2006.01) |
| B32B 3/12 | (2006.01) |
| A43B 7/08 | (2006.01) |
| A43B 13/02 | (2006.01) |
| A43B 1/00 | (2006.01) |

(52) U.S. Cl.
CPC ............. *A43B 13/12* (2013.01); *A43B 7/081* (2013.01); *A43B 13/026* (2013.01); *A43B 13/127* (2013.01); *A43B 7/082* (2013.01); *A43B 13/122* (2013.01); *A43B 1/0009* (2013.01); *A43B 7/34* (2013.01); *B32B 3/12* (2013.01); *B32B 2437/02* (2013.01)
USPC .................. 36/55; 36/3 B; 36/137; 36/75 R; 36/30 R; 36/48; 36/44; 36/83

(58) Field of Classification Search
CPC .... A43B 13/12; A43B 13/026; A43B 13/122; A43B 13/125; A43B 13/127; A43B 7/081; A43B 7/082; A43B 1/0009

USPC .............. 36/3 B, 30 R, 44, 55, 75 R, 98, 137
See application file for complete search history.

(56) References Cited

U.S. PATENT DOCUMENTS

| 1,559,532 | A | * | 10/1925 | Smith | 36/28 |
| 1,994,681 | A | | 3/1935 | Blumenfeld | |
| 4,055,699 | A | * | 10/1977 | Hsiung | 36/44 |
| 4,223,458 | A | | 9/1980 | Kihara | |
| 4,359,830 | A | | 11/1982 | Inohara | |
| 4,658,515 | A | * | 4/1987 | Oatman | 36/44 |
| 4,729,179 | A | * | 3/1988 | Quist, Jr. | 36/44 |
| 4,813,160 | A | | 3/1989 | Kuznetz | |
| 5,022,168 | A | * | 6/1991 | Jeppson et al. | 36/43 |
| 5,025,575 | A | * | 6/1991 | Lakic | 36/44 |
| 5,353,526 | A | * | 10/1994 | Foley et al. | 36/92 |
| 5,401,564 | A | * | 3/1995 | Lee et al. | 442/210 |
| 5,584,130 | A | * | 12/1996 | Perron | 36/44 |
| 6,564,475 | B2 | * | 5/2003 | Collins et al. | 36/3 R |

(Continued)

*Primary Examiner* — Clinton T Ostrup
*Assistant Examiner* — Cameron A Carter
(74) *Attorney, Agent, or Firm* — Alleman Hall McCoy Russell & Tuttle LLP

(57) ABSTRACT

The present application relates to an insulation pack in a wearable article, such as a footwear article. In one example embodiment, the insulation pack includes a perforated air retention and communication layer, an insulating compressible layer, and a reflective layer. In a compressed state, when the wearable article is worn by a wearer, the perforated air retention and communication layer and the insulating compressible layer maintain a lofted air space which is in air communication with an inner body space of the wearable article and acts as an insulating layer. Further, the reflective layer reflects radiated body heat. Thus, the insulation pack may provide a heat retention and insulation system for the wearable article by reducing body heat lost via radiation and conduction.

20 Claims, 6 Drawing Sheets

(56) References Cited

U.S. PATENT DOCUMENTS

| | | | |
|---|---|---|---|
| D478,410 S | 8/2003 | White | |
| 6,839,984 B2 | 1/2005 | Polegato | |
| 7,032,328 B2* | 4/2006 | Wilson et al. | 36/29 |
| 7,752,776 B2* | 7/2010 | Farnworth | 36/83 |
| 2001/0001351 A1* | 5/2001 | Dieckhaus | 36/44 |
| 2002/0078590 A1* | 6/2002 | Collins et al. | 36/3 R |
| 2002/0162247 A1 | 11/2002 | Hokkirigawa et al. | |
| 2006/0117599 A1* | 6/2006 | Deem et al. | 36/3 B |
| 2006/0130367 A1* | 6/2006 | Liu | 36/55 |
| 2006/0254088 A1* | 11/2006 | McCormick | 36/44 |
| 2007/0039210 A1* | 2/2007 | Clark et al. | 36/113 |
| 2007/0256333 A1 | 11/2007 | Wolf, Jr. | |
| 2009/0100722 A1* | 4/2009 | Hoffer et al. | 36/3 R |
| 2010/0122475 A1* | 5/2010 | Purrington et al. | 36/3 B |
| 2010/0122476 A1* | 5/2010 | Le et al. | 36/30 R |
| 2010/0126044 A1* | 5/2010 | Davis | 36/108 |
| 2010/0154252 A1* | 6/2010 | Avent et al. | 36/91 |
| 2010/0199406 A1* | 8/2010 | Dua et al. | 2/115 |
| 2010/0251567 A1* | 10/2010 | McInnis et al. | 36/29 |
| 2010/0319221 A1* | 12/2010 | McClaskie | 36/25 R |

\* cited by examiner

HEAT RETENTION AND INSULATION SYSTEM FOR WEARABLE ARTICLES

FIELD

The present application relates to an insulation pack for a wearable article, such as footwear.

BACKGROUND AND SUMMARY

The protective and insulating capabilities of wearable articles, including footwear, are important considerations depending on the intended use of such wearable articles. As an example, manufacturers have adapted footwear to perform based on potential outside conditions that the footwear is to be exposed to provide better comfort and protection for a user. For example, cold-weather footwear may be designed to retain or maintain heat and protect a user's foot from cold and/or wet conditions. Exterior protective layers and internal linings have been used to attempt to retain heat within such footwear.

However, in known cold-weather footwear, heat loss may occur through radiation and conduction of heat from the wearer's foot to the cold, exterior surfaces in contact with the footwear. For example, the outsole of the footwear may conduct heat to exterior surfaces of the footwear. In some examples, such exterior surfaces may be exposed to the elements and may be covered in ice and snow. In conventional cold-weather footwear, various insulating layers with lofted air may be used to attempt to reduce heat transfer. However, positioning lofted airspace in the insole and/or midsole in such footwear results in excessive compression due to the wearer's weight, thus decreasing the lofted airspace and effectively eliminating the insulating ability of such layers during wear.

In one approach, described in U.S. Patent Application Publication 2006/0130367, a heat insulating lining is described with a porous layer disposed between two reflective layers which are vacuum sealed in an enclosure body. The porous layer comprises an elastic material, while the reflective layers comprise a metal having low conductivity. Further, a foam layer, comprising an elastic cushioning material, may be disposed outside of the vacuum sealed enclosure. During use, heat radiation is impeded by the reflective layers and conduction is inhibited by the vacuum of the sealed enclosure body.

The inventors herein recognize potential issues with the above vacuum configuration. As one example, vacuum sealing may degrade over time, and thus loss of the vacuum may result in loss of the insulating ability of the footwear. As another example, even if the vacuum is maintained over the life of the footwear, the lack of heat capacity of the vacuum layer reduces its ability to store heat. For example, even if radiated heat is reflected back into the foot space; the insulating layer as part of the vacuum cannot absorb and store the radiated heat. The inability to store radiated heat reduces the capability to maintain a warm internal space.

Thus, and as described in detail herein, some of the above issues may be at least partly addressed by the herein disclosed layered insulation pack for a wearable article, where the layered insulation pack includes a perforated layer, a compressible layer, and a reflective layer. The perforated layer may operate as a perforated air communication and retention layer in air communication with an inner body space. The compressible layer may be more compressible than the perforated layer.

In one example, the compressible layer and the perforated layer may comprise a lofted air space to store air even when compressed under the weight of a wearer. Radiated body heat from a foot of a wearer may be reflected by the reflective layer. The radiated body heat and the reflected body heat may warm air in the lofted air space and in the inner body space of the article. Further, warmed air in the inner body space may circulate during movement of the wearer and pass into and out of the lofted air space. Further, the warm air in the lofted air space may act as an insulating layer, limiting conduction of body heat to a cold exterior environment.

As a specific example, and not as a limitation, the layered insulation pack may be positioned in a sole, such as in a midsole, of a boot. In this specific example, the insulation pack comprises a honeycomb perforated layer including a plurality of hexagonal perforations, which are in air communication with the inner body space of the boot. The insulation pack further comprises an insulating layer, which is adhered to and in face-sharing contact with the honeycomb perforated layer. The insulating layer includes a network of fibers which are capable of holding air and are in air communication with the plurality of hexagonal perforations. The insulating layer may be more compressible than the honeycomb layer. The insulation pack may also include a reflective layer, which may be adhered to and in face-sharing contact with the insulating layer and the foam layer.

By providing a layered insulation pack with a lofted air space from the perforated layer, heated air may circulate throughout the inner body space of the footwear. Air retained in the footwear may be warmed by radiated body heat and retained within the perforated and insulating layers. Further, the reflective layer reflects the warmed air (the radiated body heat) back into the lofted air space and the inner body space, thus contributing to warming the wearer's foot. The retention of the warmed air in the lofted air space insulates the wearer from heat loss by reducing the conduction of body heat through the outsole to a cold exterior surface.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The figures are drawn to scale, but such scale is one example and various modifications to sizes, dimensions, and relative positioning may be made, if desired.

DETAILED DESCRIPTION

The following description relates to an insulation and warmth retention system for a wearable article or item. As described in more detail below, in one example, an insulation and warmth retention system may include a layered insulation pack. The layered insulation pack may include a perforated air communication and retention layer, also referred to as a perforated layer, a compressible layer and a reflective layer. The perforated layer may be disposed in the wearable article such that it is in air communication with an inner body space. A lofted air space may be formed from the perforated layer where heated air may circulate throughout the inner body space of the wearable article through the perforated layer. Air retained in the wearable article, such as for example, footwear, may be warmed by radiated body heat and retained within the perforated and insulating layers. Further, in some embodiments, the reflective layer may reflect the warmed air (the radiated body heat) back into the lofted air space and the inner body space, thus contributing to warmth retention.

As described in more detail below, in some examples, the perforated layer and retention layer may be in face-sharing contact with and adhered to the compressible layer. Further, the compressible layer may be in face-sharing contact with and adhered or otherwise secured to the reflective layer and the perforated layer. For example, in footwear, the perforated layer may be proximate to the insole and the reflective layer may be proximate to the outsole. Further, in some embodiments, the insulation pack may include a fabric layer. The fabric layer may be in face-sharing contact with and adhered or otherwise secured to the perforated layer.

Figure 1A:
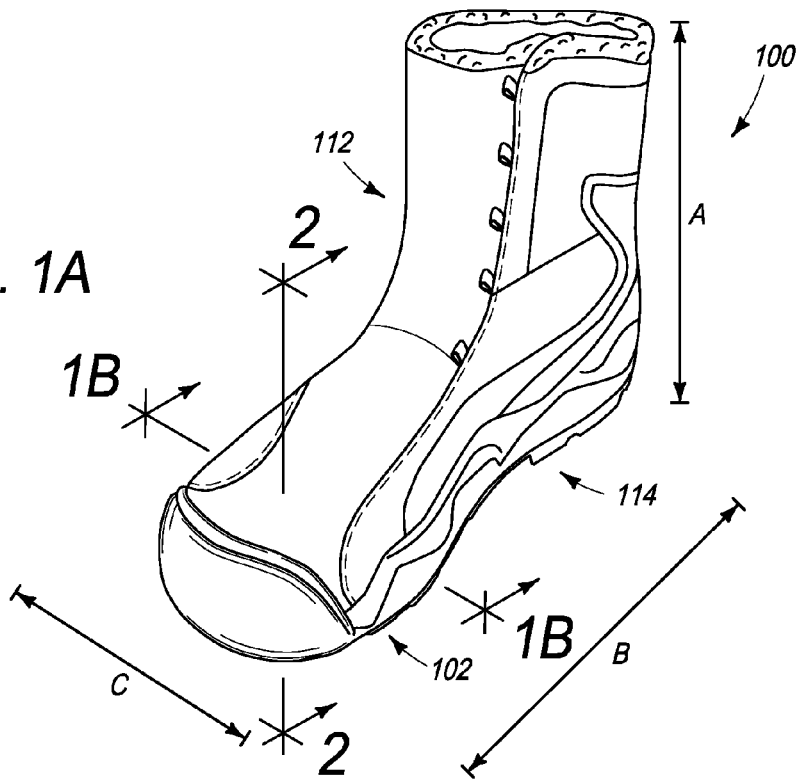
FIG. 1A includes an example embodiment of a footwear article which may include an insulation pack.

Turning now to the figures, FIG. 1A shows an example embodiment of a boot 100 which may include an insulation and warmth retention system, such as an underfoot insulation pack. Although shown in regards to a boot, it should be appreciated that the described insulation and warmth retention system may be applied to other footwear, and/or to other wearable articles, including, but not limited to, jackets, helmets, bibs, pants, outerwear, etc.

Boot 100 may be adapted to be worn in cold climate conditions. Boot 100 may include a ground contacting surface 102 which may be configured to contact an exterior surface, such as a cold ground surface, an ice and/or snow covered surface, etc. As described in more detail below, the insulation and warmth retention system provides a configuration for retaining heat within the interior of boot and for reducing transfer of heat to the exterior ground contacting surface.

As shown, boot 100 may encase a foot and an ankle of a wearer when worn. The boot may have a height A, a length B, and a width C. The boot design may be fabricated in multiple sizes to accommodate different wearers with feet of different sizes. As shown, the example boot 100 may further include an upper 112 and a sole 114. The upper may be comprised of leather and/or a synthetic material, such as polyurethane or other suitable material.

Figure 1B:
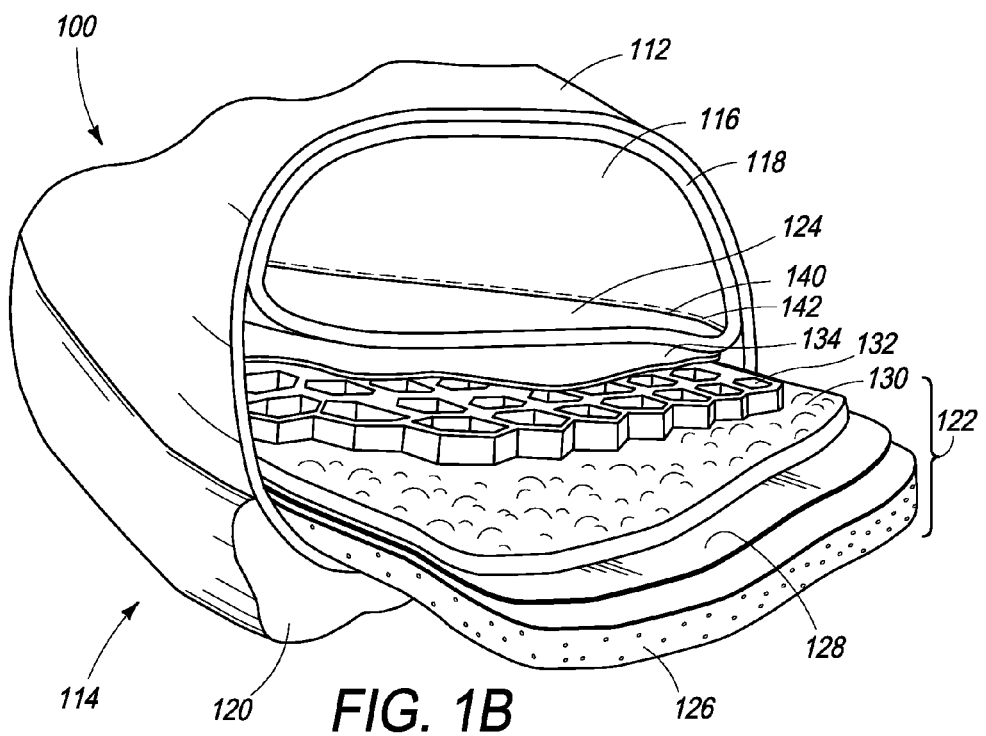
FIG. 1B includes an embodiment of a lateral cross section of the footwear article of FIG. 1.
Figure 1C:
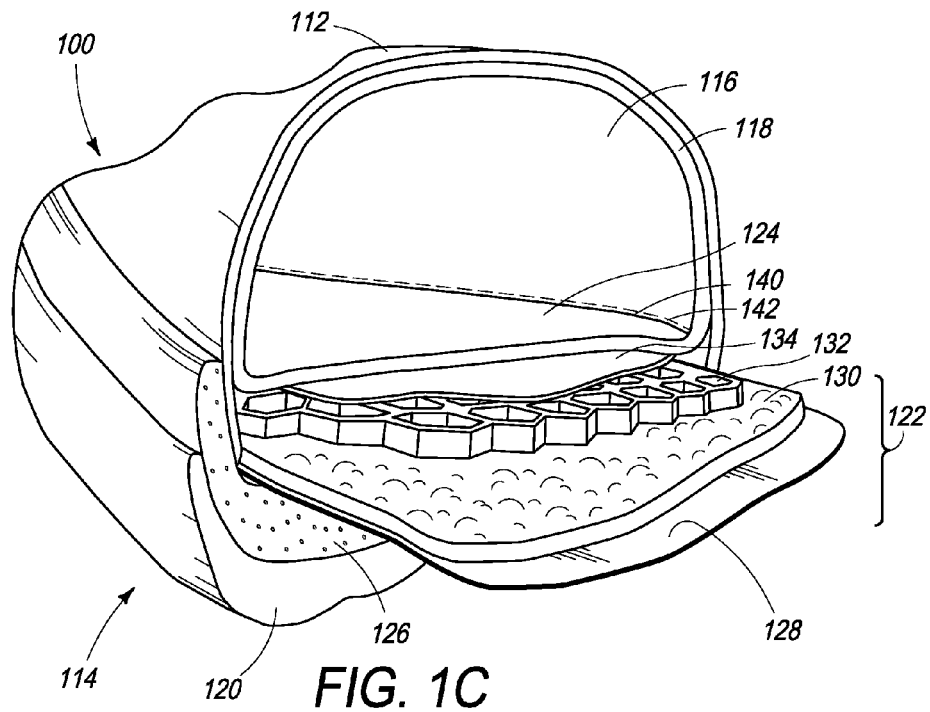
FIG. 1C includes another embodiment of a lateral cross section of the footwear article of FIG. 1.

FIGS. 1B and 1C further shows details of boot 100. Specifically, FIGS. 1B and 1C show alternate embodiments of a cross-section of the boot of FIG. 1A along the 1B axis. As shown, upper 112 is disposed above sole 114 defining an inner body space 116. A wearer may position their foot in the inner-body space. Portions of the wearer's ankle and leg may be enclosed by the upper depending on the sizing of the boot.

In some examples, upper 112 may include a lining 118 which has an overall shape and size that corresponds to that of a foot and ankle.

For ease of description, sole 114 is shown and described as including at least three portions: an outsole 120, a midsole 122, and an insole 124. These portions may be in a layered configuration. The outsole 120 is disposed at least partially along the ground contacting surface 102 of the boot 100. In the embodiment of FIG. 1B, the upper 112 extends between the midsole 122 and the outsole 120, and may be continuous around the inner body space 116 or may be discontinuous, extending only partially beneath the midsole 122. Further, in this embodiment, the midsole 122 (except for a foam layer 126, which is a portion of the midsole) is disposed above the outsole in the inner body space 116.

The embodiment shown in FIG. 1C shows another embodiment of a cross-section of the boot of FIG. 1A along the 1B axis. In this embodiment, the upper 112 extends only partially into the sole 114, between the foam layer 126 of the midsole and the insole 124. The other layers of the midsole (128-134, described below) are disposed within the foam layer 126. Further, in this embodiment, foam layer 126 is disposed proximate to the outsole and may form an approximate airtight seal with the outsole. The heat retention and insulation system disclosed herein may be substantially positioned or disposed within one or more of the sole layers, such as for example the midsole. FIGS. 2-6 provide further detail of the embodiment depicted in FIG. 1C.

Figure 2:
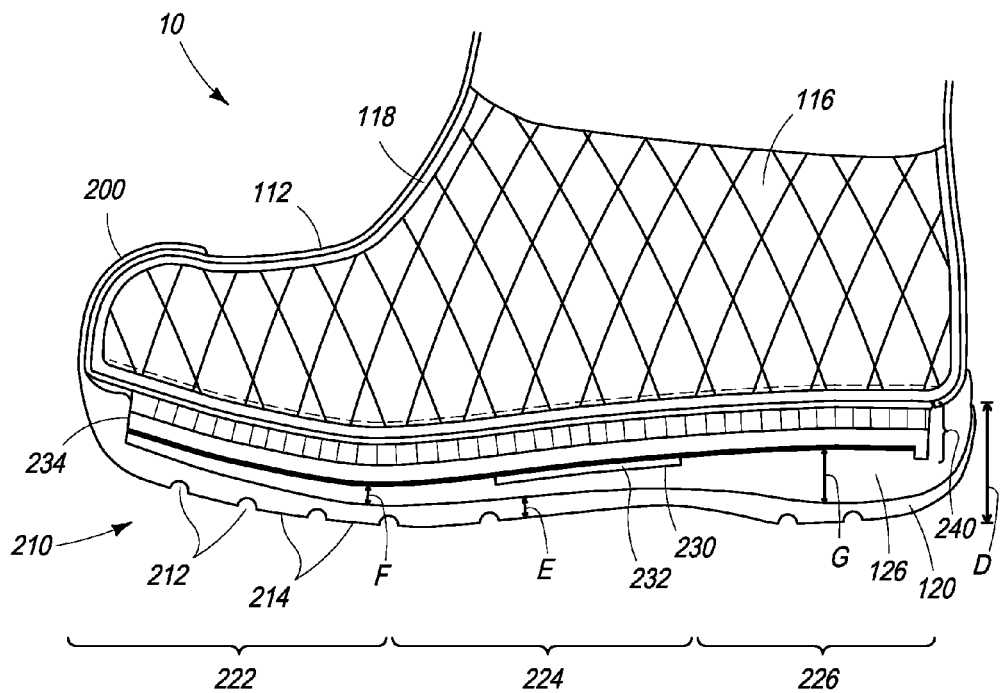
FIG. 2 includes a longitudinal cross section of the footwear article of FIG. 1.

As shown in FIG. 2, outsole 120 may have an overall uniform thickness E. Thickness E may be variable depending on the surface qualities of outsole 120. The outsole may be comprised of a hard rubber or synthetic material.

In some examples, such as shown in FIG. 2, outsole 120 may include a tread pattern 210. In some examples, the tread pattern may increase or enhance traction during use, such as when walking, hiking, and/or running. In the illustrated embodiment, tread pattern 210 is shown with a plurality of grooves 212 and/or projections or projection surfaces 214. In one example, grooves 212 may have an approximately equal depth as the length of projections 214, although other shaped and sized tread patterns may be used, if desired. It should be appreciated that in some embodiments, additional traction structures, such as spikes or other structures may be incorporated or attached to the outsole.

Still referring to FIG. 2, in the illustrated embodiment, the outsole may extend upwards from the ground contacting surface such that portions of the outsole are not in contact with the ground. As illustrated, in one example, the outsole 120 may extend over a forefoot region 222 of the upper 112 forming a toe cap 200 of outsole 120. Although shown with a full toe cap, it should be appreciated that the outsole may not extend fully over the forefoot region or may only partially extend over the forefoot region.

Similarly, the outsole may extend partially or fully along the mid-foot region 224 and/or the hindfoot region 226. In the illustrated embodiment, the outsole is shown partially extended over hindfoot region 224, substantially extended to a height D.

Returning briefly to FIG. 1, midsole 122 extends at least partially along or is disposed adjacent to a portion of the interior face of outsole 120. Midsole 122 may include a plurality of layers, including, but not limited to a cushioning or foam layer 126, reflective layer 128, compressible layer 130, perforated layer 132, and fabric layer 134. Although described in regards to a series of layers, it should be appreciated that additional layers may be incorporated in the midsole or layers deleted from the midsole without departing from the scope of the disclosure. Further, although shown where the layers extend along the substantial length of the boot, such layers may only partially extend in select regions of the midsole.

Turning first to the foam layer 126 of midsole 122 (shown in FIGS. 1B, 1C, and 2), the foam layer is illustrated (as an example) as being disposed above outsole 120 along the interior face of outsole 120. Foam layer 126 may be molded to the shape of outsole 120 and may form (in some embodiments) an approximate air-tight seal with outsole 120. Outsole 120 may fully enclose foam layer 126. In other embodiments, foam layer 126 may extend beyond portions of the outsole. For example, the foam layer may be covered by outsole 120 as shown by toe cap 200. Further, in some examples, the foam layer may partially extend over outsole, such as an extension over the hindfoot region.

As shown in FIG. 2, the foam layer 126 may have a height F at the forefoot region 222, and a height G at the hindfoot region 226. The height of the foam layer may vary or be substantially the same over the length of the boot. For example, in the illustrated embodiment, the height G is greater than the height F. The foam layer 126 may be comprised of a soft or other suitable material, such as a cushioning material. In some examples, the foam layer may have a higher compressibility or lower durometer than that of the outsole.

Again referring to FIGS. 1B and 1C, extending at least partially along foam layer 126 are the layers of the insulation pack. The insulation pack may be disposed in a recess of the foam layer. The insulation pack layers, include, but are not limited to, reflective layer 128, compressible layer 130, perforated layer 132, and/or fabric layer 134.

In some embodiments, the insulation pack may be disposed in one or more recesses defined by or within one or both of the foam layer 126 and/or outsole 120. For example, a recess 234 may extend a portion of the length and the width of the sole. In the illustrated embodiment, the recess extends substantially along the sole, extending to 80-90% of the length and the width of the sole. Insulation pack 240 may be received in this recess 234.

It is noted that in some examples, a lip 350 may surround or partially surround the insulation pack 240 when received in the foam layer recess. The lip may retain or prevent the insulation pack from slipping from the desired position in the footwear. In some examples, the lip may have a depth/height X, which is approximately equal to a total height of the insulation pack 240. In one example, the second recess has a depth/height of 8 mm and the width of the lip may be in the range of 9-12 mm. It is noted that additional retention and security mechanisms, including stitching, adhesive, etc. may further be used, in some embodiments, to retain the insulation pack (and/or one or more of the layers of the insulation pack) in position.

Although illustrated where a single insulation pack is retained in a foam layer recess, it should be appreciated that in alternate embodiments, the foam layer 126 may include multiple recesses, such as one or more recesses at each of the forefoot region and the hindfoot region. In this alternate embodiment, separate insulation packs may be disposed in each of the recesses. Further, in some embodiments, the insulation pack may engage the foam layer without the use of recesses.

Figure 3:
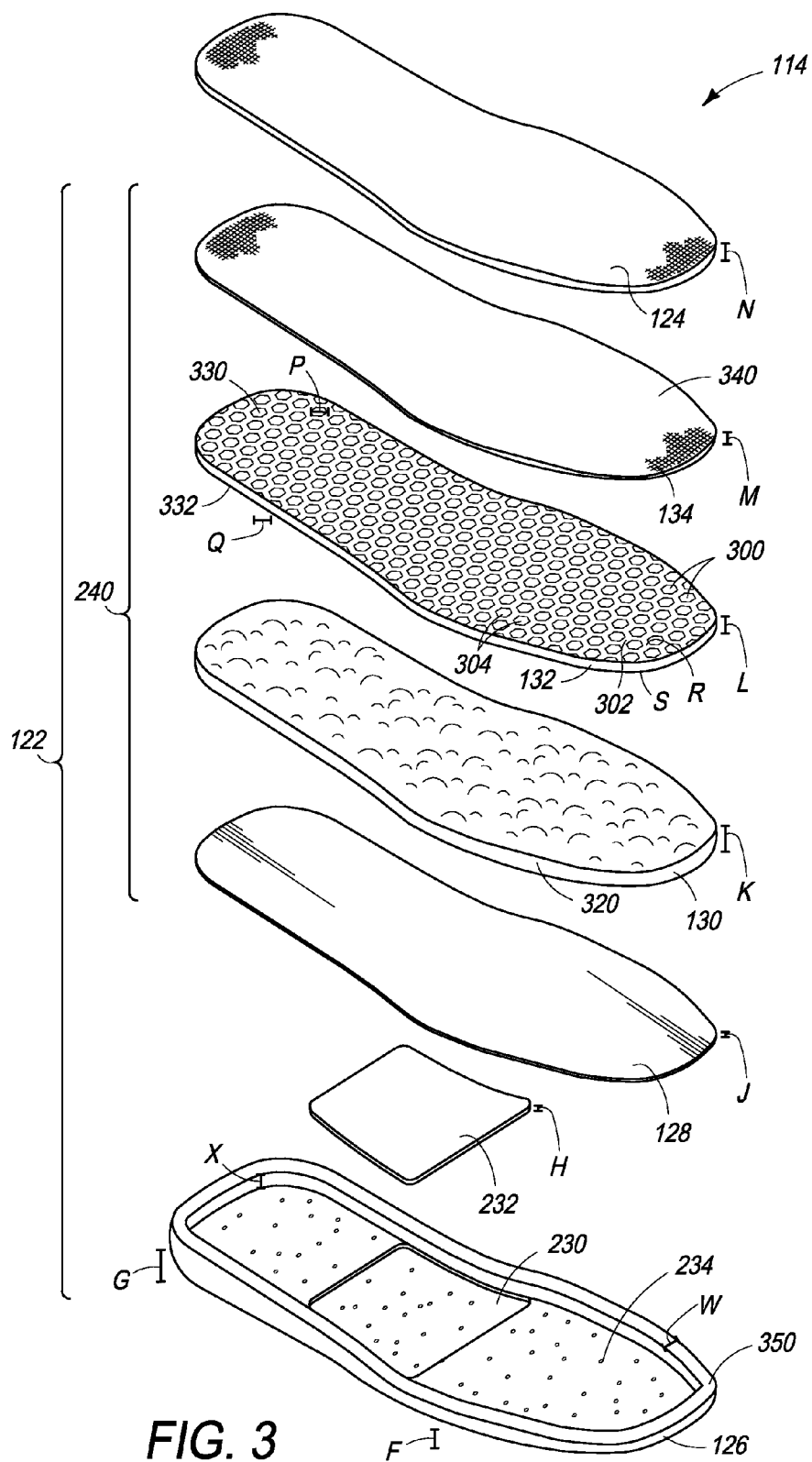
FIG. 3 includes an exploded view of the layers of an insole and a midsole.

Turning to FIG. 3, the midsole 122 is shown in detail with foam layer 126 forming the bottom layer and insulation pack 240 disposed above or received within the foam layer 126. As described herein, the insulation pack may provide both heat retention and insulation from a cold exterior surface. In one example, an insulation pack is provided where heat is radiated from a wearer's body and may be reflected into an inner body space by a reflective layer. The reflected heat may warm air which is in the lofted air space of the insulation pack. Further, the lofted air space may be in air communication with the inner body space and may circulate and mix with the warm air of the inner body space. Thus, warm air may be retained to heat an inner body space. Further, in some examples, the warm air in the lofted air space provides an insulating layer which limits conduction of body heat to exterior surfaces.

Each layer of the insulation pack, the reflective layer 128, the compressible layer 130, the perforated layer 132, also referred to as an air retention and communication layer, and the fabric layer 134, is shown extending substantially along the length of the boot and the length of the foam layer. The layers of the insulation pack are disposed in face-sharing contact with at least a portion of the adjacent layer. Although shown as extending along the length of the boot, it should be appreciated that the insulation pack, and/or one or more of the layers of the insulation pack may only partially extend along a portion of the foam layer.

In the illustrated embodiment, foam layer 126 is external of the boot 100 relative to the insulation pack 240. The insulation pack 240 substantially extends the length of the sole 114. In one example, the insulation pack may have a length of approximately 80-90% of the length of the boot. The layers of the insulation pack may be joined by an adhesive, stitching, or other securing mechanism. In an alternate embodiment, one or more layers of the insulation pack may be joined with an adhesive and/or may be stitched together. Further, in some embodiments, one or more layers may be retained without an adhesive or stitching and may be frictionally positioned or otherwise sandwiched into the midsole.

The bottom layer of the insulation pack, as illustrated, is reflective layer 128. In the illustrated embodiment (shown in detail in FIG. 3), the reflective layer may be adjacent to foam layer 126. The reflective layer 128 has a height J, which in one example is less the 1 mm. The reflective layer 128 may comprise a reflective material, such as a metallic foil, such as a silver foil or an aluminum foil. The reflective layer 128 may alternatively be comprised of mylar or other suitable reflective material.

Although shown with a single reflective layer, it should be appreciated that one or more additional reflective layers may be included in the insulation pack. Further, although shown as extending along the entire length of the boot, the reflective layer may be limited to only a select region or regions and/or position or positions in the foam layer. It should further be appreciated that in another alternate embodiment, the reflective layer may be excluded from the insulation pack.

The insulation pack may further include a compressible layer 130 disposed above the reflective layer and below the perforated layer 132. The compressible layer has a uniform height K, which is approximately equal to the height E. As an example, and not as a limitation, the compressible layer may have a height in the range of 1 to 10 mm, such as approximately 5.5 mm. Although shown with a uniform height, it should be appreciated that in some embodiments, the height may vary along different positions in the boot. Further, the compressible layer may have a higher compressibility or lower durometer than the outsole and/or the foam layer.

As one example, the compressible layer may be comprised of a compressible material, such as wool felt. The felt may be comprised of pressed woolen fibers and may form a network of fibers or fiber network 320. Air may be captured or trapped in the fiber network. In other embodiments, the compressible layer may be comprised fully or partially of an alternate woven material or synthetic fibers.

Positioned adjacent the compressible layer 130, is perforated layer 132. The perforated layer which is an air communication and retention layer, is interposed compressible layer 130 and fabric layer 134. The perforated layer 132 has a height L. In one example, the perforated layer has a height in the range of 0.5 to 8 mm, such as approximately 3 mm. Although shown with a uniform height, it should be appreciated that in some embodiments, the height may vary along different positions in the boot.

The perforated layer 132 may be flexible, in that the layer may bend about a plurality of axes, yet may be substantially resistant to a compressive force normal to its upper and/or lower surface.

As one example, the perforated layer may be comprised of a relatively hard elastomeric compound, such as EVA, or other suitable material. The perforated layer may have a lower compressibility or higher durometer than the compressible layer, and the foam layer. In some embodiments, the perforated layer durometer may be relatively similar to that of the outsole.

As depicted, the perforated layer 132 may include a plurality of perforations 300. In one example, the perforations may be hexagonal in shape, thereby forming a honeycomb configuration. The honeycomb configuration may provide a desired flexibility along a flex axis while still retaining a substantially reduced compressible layer. In an alternate embodiment, the perforations may have an alternative shape, such as circular, square, octagonal, etc.

The plurality of perforations 300 form a plurality of air pockets 304 or air channels in the perforated layer. The plurality of air pockets 304 are in air communication with the fiber network 320. In combination, the perforated layer 132 and the compressible layer 130 form lofted air space 520 (shown in FIGS. 5 and 6). The lofted air space 520 is in air communication with the inner body space 116 such that the heated air may circulate within the lofted air space.

In the example embodiment shown in FIG. 3, the hexagonal perforations 300 have a diameter P at the internal face 330 of the perforated layer (side adjacent to the fabric layer), and a diameter Q at the external face 332 of the perforated layer (side adjacent to the compressible layer). In some examples, the diameter P may be greater than the diameter Q. As an example and not as a limitation, the diameter P is 5.5 mm and the diameter Q is 4 mm. A wall 302 between each of the hexagonal perforations 300 has a width R on the internal side 330 of the perforated layer 132, and a width S on an external side 332 of the perforated layer 132. The width R may be less than the width S. An example of width R is 2 mm and an example of width S is 4 mm. It should be appreciated that these dimensions represent one example, and that the relative size and shape may be adjusted, if desired. As such the diameter P and diameter Q may be substantially the same and/or Q may be larger or smaller than P. Similarly, the widths R and S may be substantially the same and/or larger or smaller than the other. Thus, in another alternate embodiment, the diameter of the perforations and the width of the walls may be uniform on one or both of the internal face and the external face of the perforated layer. In yet another alternate embodiment, the height of the perforated layer may be non-uniform. For example, the perforated layer may have a greater height at the forefoot region and/or the hindfoot region than at the midfoot region, or vice versa.

Referring again to FIG. 3, the insulation pack may further include one or more fabric layers. Although shown as part of the insulation pack, in an alternate embodiment, the fabric layer may be excluded from the insulation pack. In some examples, the perimeter 340 of the fabric layer 134 may be stitched to the boot, such as to upper 112. In some examples, the stitches may extend partially through the perforated layer 132. In other embodiments, the fabric layer may be secured or adhered by other means, including use of adhesive, friction compression, etc.

In the illustrated embodiment of FIG. 3, fabric layer 134 may extend on a portion of the upper surface of the perforated layer. In some examples, the fabric layer may include additional perforations which correspond or otherwise engage against the perforated layer. In some examples, the fabric layer may be comprised of a woven material or any other suitable synthetic or natural fiber or fabric material.

The fabric layer has a height M. In the illustrated embodiment, the height M may be less than the height L of the perforated layer. As an example and not as a limitation, the height M of the fabric layer may be in the range of 0.05 to 2 mm, such as approximately 1 mm.

As described above, the insulation pack is disposed in the midsole such to provide a heat and insulation system for the wearable article, such as footwear. In some examples, the insulation pack is further retained within additional top layers, such as insole 124.

As an example insole 124 may be disposed above fabric layer 134 in the inner body space 116. In some examples, the insole has insole 124 has a height N and may include one or more layers. In the illustrated example, the insole height N may be greater than the height M of the fabric layer and/or less that the height L of the perforated layer. In one example, and not as a limitation, the height N of the insole may be in the range of 1 to 4 mm, such as approximately 2 mm.

In some examples, the insole or strobel may be stitched, adhered, or otherwise secured to one of the insulation pack, the lining, such as the lining of the upper, or the foam layer. Further, the fabric layer and/or the perforated layer may be stitched to the upper. In one example, such as shown in FIGS. 1B and 1C, a perimeter 140 of the insole 124 may be stitched to the lining 118 by stitching 142. In an alternate embodiment, lining 118 may be stitched to the fabric layer 134 and the insole 124 may be a removable insole. In another example embodiment, an additional removable insole may be used in combination with a non-removable insole.

Briefly, it should be noted that additional layers may be incorporated in the midsole and insole. For example, foam layer 126 may include one or more recesses, such as recess 230 to engage additional layering and/or footwear support. In one example, recess 230 may extend only partially along a section of the boot, such as the midfoot region and may be configured to receive a shank layer, such as shank 232. Shank 232 may be substantially stiff, and thus less flexible than the outsole, or any other layers in the boot. The shank 232 may provide support to a wearer at the midfoot region 224 of the boot. The shank 232 may be comprised of a hard plastic or other desired material. It should be appreciated that in alternate embodiments, without departing from the scope of the disclosure, the shank may be excluded from the sole or may have a greater or lesser height and/or length than shown.

Figure 4A:
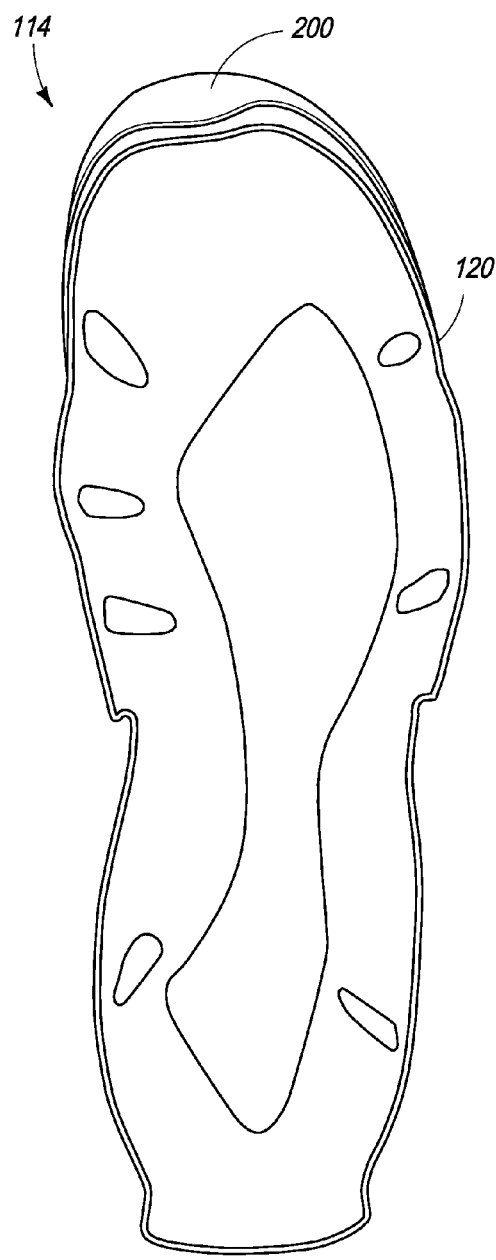
FIGS. 4A and 4B include a top view of an outsole and a top view of a midsole, respectively.
Figure 4B:
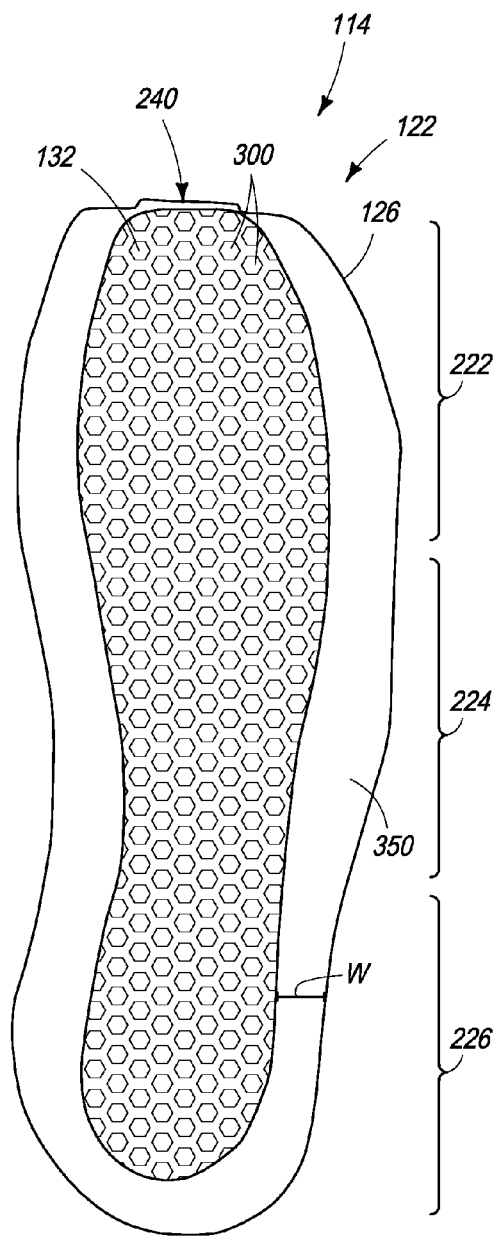

Turning now to FIGS. 4A and 4B, additional views of an example outsole are shown. Specifically, FIG. 4A depicts a top view of the outsole 120 without the midsole. It is noted that in this example embodiment the toe cap 200 extends upward over the toe region. Such a configuration is shown for illustrative purposes only.

FIG. 4B depicts a top view of the midsole 122 without the top fabric layer. In this view, the insulation pack 240 extends approximately the length and width of the sole except at the lip 350. In an alternate embodiment the insulation pack may be discontinuous. For example, the insulation pack may be located in the forefoot region 222 and the hindfoot region 226, but not in the midfoot region 224. In another example, the insulation pack may be only in the forefoot region 222.

Figure 5:
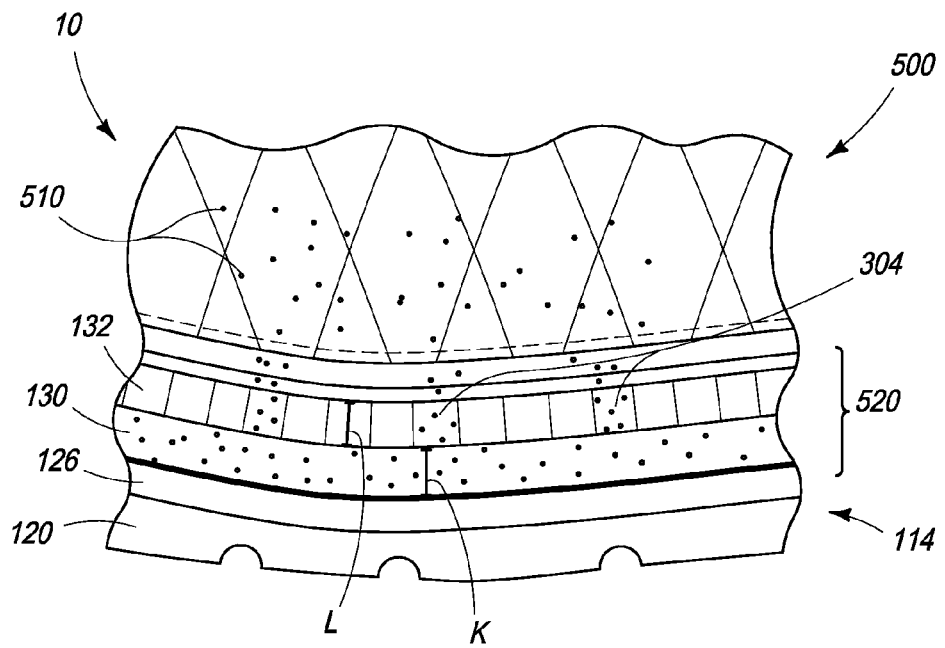
FIG. 5 includes a detailed view of a sole of the footwear article of FIG. 1 in a non-compressed, non-worn state.
Figure 6:
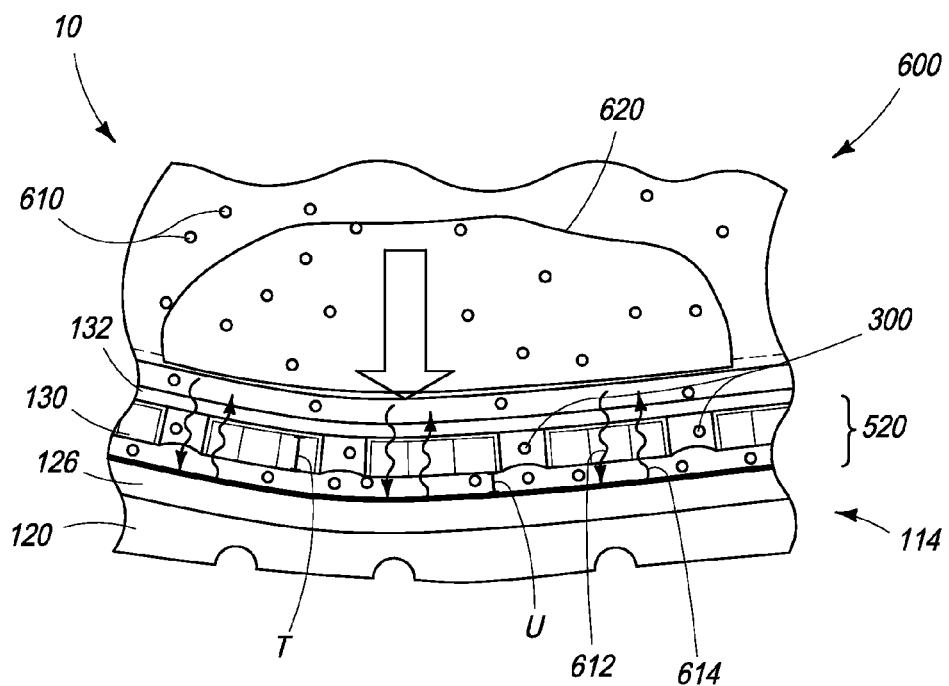
FIG. 6 includes a detailed view of a sole of the footwear article of FIG. 1 in a compressed, worn state.

In order to further describe the heat retention and insulation system described above, illustrative examples of heat retention within an exemplary system is shown in FIGS. 5 and 6. Specifically, FIGS. 5 and 6 provide comparative views of the sole in a non-compressed state 500 and a compressed state 600.

In FIG. 5, a cutaway of a boot 10 is shown in a non-compressed state 500. As an example, the sole may be in the non-compressed state when the boot is not worn by a wearer. In the non-compressed state, air may pass through the various layers and the insulation pack. For example, cold air 510 is shown in the inner body space. The inner body space may be in air communication with the air pockets 304 of the perforated layer 132 via the perimeter 340. Further, the air pockets 304 may be in air communication with the air within the fiber network of the compressible layer 130. In the illustrated embodiment, the cold air 510 within the fiber network does not directly communicate with air on the external side of boot through the outsole 120 as the foam layer 126 and the outsole 120 may form a substantially air-tight seal.

In FIG. 6, a cutaway of the boot 10 is shown in a compressed state 600. The sole may be in the compressed state 600 when the boot 10 is worn by a wearer. When worn by a wearer, a wearer's foot 620 may be disposed in the inner body space. The wearer's foot 620 radiates body heat 612 which may be reflected off of the reflective layer as reflected radiated heat 614. Both the radiated body heat 612 and reflected radiated heat 614 may contribute to warming of warm air 610 in the lofted air space and the inner body space. Further, as the wearer moves/walks, air may be circulated throughout the lofted air space and the inner body space so that warm air 610 is distributed throughout the insulation pack, and further distributed throughout the inner space of the boot.

During wear, the outsole 120 of the boot may engage a cold exterior surface, such as a surface covered in snow and/or ice. Body heat, as described above, may be retained within the insulation pack. For example, warm air 610 in the lofted air space 520 may act as an insulating layer and limit conduction of body heat to the cold exterior surface. The sizing and positioning of the various layers, as well as the differential compression of the layers under a wearer's foot, provide sufficient lofted airspace to capture and retain generated heat. Further, because of the air communication between the layers, the heat capacity of the warmed air may be used to not only insulate the wearer's foot, but also distribute heat from one region within the insulation pack to another region within the insulation pack, such as from a forefoot region to a hindfoot region, or vice versa.

It is noted that in some examples, the compressed state may include compression of one or more layers. In the compressed state, the compressible layer may decrease in height, while the perforated layer substantially maintains its height, or decreases in height to a significantly lesser degree than the compressible layer. For example, in the illustrated compressed state, the height of the perforated layer may decrease from the height L to a height T, wherein height T is less than height L. Further, the height of the compressible layer 130 may decrease from the height K to a height U, wherein the height U is less than the height T. As the compressible layer 130 may be more compressible than the perforated layer 132, a first difference between the height L and the height T is greater than a second difference between the height K and the height U. The compressible layer 130 may be partially disposed in each of the plurality of perforations 300 in the compressed state 600. In some embodiments, other layers, such as reflective layer 128 and outsole 120 may retain their heights in the compressed state 600.

Figure 7:
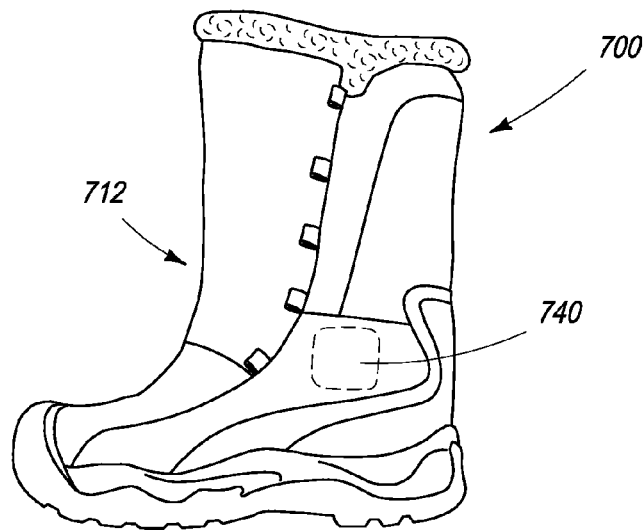
FIGS. 7-9 depict alternate applications for an insulation pack.
Figure 8:
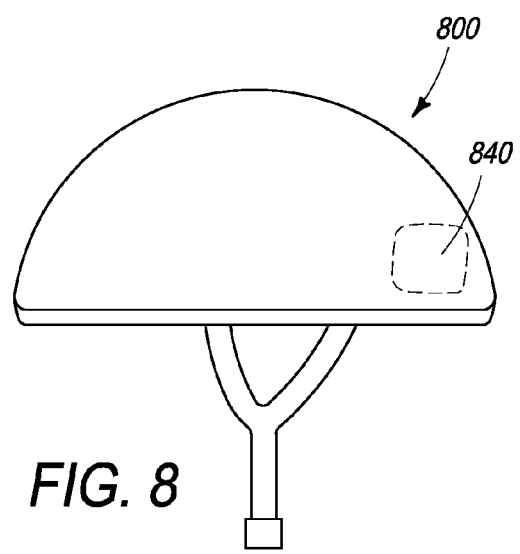
Figure 9:
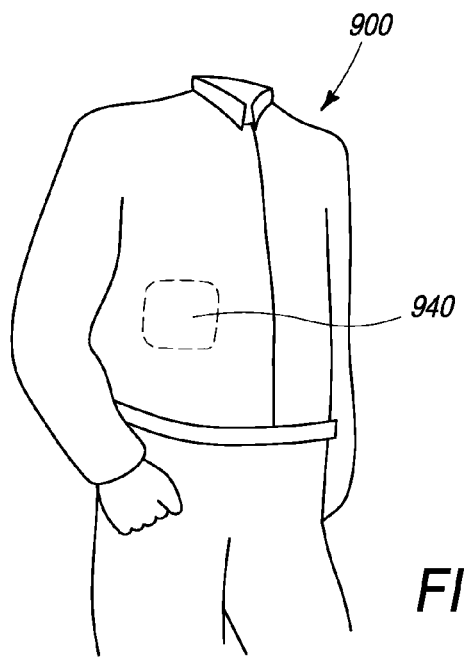

As mentioned above, the heat retention and insulation system may be applied to other wearable articles. FIGS. 7-9 depict alternative applications of the insulation pack and the use of the heat retention and insulation system described herein.

For example, as shown in FIG. 7, an insulation pack 740 may be included in regions other than the midsole of an article of footwear, such the depicted article of footwear 700. Thus, the insulation pack 740 may be disposed in select regions of footwear 700 where there is heat loss or potential heat loss. For example, the insulation pack may be disposed along the lining of the upper 712 of footwear 700. The insulation pack may extend along a select region or may be pocketed for use in select regions of the footwear.

Further, as depicted in FIGS. 8 and 9, the insulation pack may be included in other apparel or worn articles. For example, as shown in FIG. 8, the insulation pack 840 may be included in a helmet 800. In this example, an inner body space is an internal space wherein a head may be fitted and body heat from the head may be retained for insulation. In another example, as shown in FIG. 9, an insulation pack 940 may be included in a lining of apparel, such as a jacket 900. In this example, an inner body space is an internal space wherein a torso may be fitted and body heat from the torso may be retained for insulation. In some examples, the insulation pack may be used in a substantially non-bendable portion of a wearable article, such as a helmet, a jacket, bibs, etc. Moreover, depending on the material and flexibility of the perforated region, the insulation pack may be used in alternative positions in such wearable articles.

It should be appreciated that the above alternative examples are provided for illustrative purposes only and not as a limitation. The disclosed heat retention and insulation system may be applied in any suitable wearable article to increase heat retention. Similarly, the disclosed heat retention and insulation system may be used in articles which engage the body, but may not be worn. Thus, the heat retention and insulation system can be applied to other objects that contact a body and are used in a cold environment, such as a seat cushion of a snowmobile or other seat or body engagement surface.

The above description provides examples related to the disclosed insulating and heat retention system for worn articles, such as footwear and apparel. In one example, an insulation pack is provided disposed in air communication with an inner body space. The inner body space may be sealed by a substantially air tight seal on an outer surface of the worn article. In some examples, the insulation pack may include a perforated air communication and retention layer, a compressible felt layer forming a fiber network, and a reflective layer. Perforations within the perforated air communication and retention layer and air within the fiber network define a lofted air space, wherein air may communicate freely between the layers and the inner body space. Radiated body heat may be reflected off of the reflective layer back into the lofted air space and the inner body space. Heat radiated by the body of a wearer, as well as radiated body heat reflected off of the reflective layer, may warm air in the lofted air space and the inner body space. Therefore, warm air may be retained within the worn article and circulated throughout the inner body space of the article. Additionally, the warm air in the lofted air space may insulate and limit conduction of body heat to exterior surfaces. In this way, the worn article can provide increased warmth and comfort in a cold environment.

The subject matter of the present disclosure includes all novel and non-obvious combinations and sub-combinations of the various systems and configurations, and other features, functions, and/or properties disclosed herein. For example, it will be appreciated that the configurations disclosed herein are exemplary in nature, and that these specific embodiments are not to be considered in a limiting sense, because numerous variations are possible.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A layered insulation pack for a footwear article worn on a human body, comprising:
   a perforated air communication and retention layer;
   a reflective layer; and
   a compressible layer interposed between the perforated air communication and retention layer and the reflective layer, the compressible layer more compressible than the perforated air communication and retention layer,
   wherein the perforated air communication and retention layer of the insulation pack is adapted to be in air communication with an inner body space of the footwear article, the inner body space is adapted to have a foot of a wearer positioned therein during wear of the footwear article,
   wherein the compressible layer and the perforated air communication and retention layer comprise a lofted air space to store air which passes into and out of the lofted air space from the inner body space during movement of the wearer.

2. The layered insulation pack of claim 1, wherein an air tight seal is disposed between a ground contacting surface of the footwear article and the insulation pack.

3. The layered insulation pack of claim 2, wherein the insulation pack is disposed within a midsole of a boot, between an insole and an outsole.

4. The layered insulation pack of claim 3, wherein the perforated air communication and retention layer is in face-sharing contact with and adhered to the compressible layer, and the compressible layer is in face-sharing contact with and adhered to the reflective layer, the perforated air communication and retention layer proximate to the insole, the reflective layer proximate to the outsole.

5. The layered insulation pack of claim 1, wherein the insulation pack includes a fabric layer, the fabric layer in face-sharing contact with and adhered to the perforated air communication and retention layer.

6. The layered insulation pack of claim 3, wherein a foam layer is adhered to the outsole, and the foam layer and the outsole form a recess with a lip at a perimeter of the outsole and the midsole, the insulation pack is fitted within the recess, the insulation pack flush with the lip of the foam layer at a hindfoot region of the footwear article, and the insulation pack further flush with the lip of the outsole at a forefoot region of the footwear article.

7. The layered insulation pack of claim 5, wherein the perforated layer includes a plurality of regularly spaced hexagonal perforations, the perforated layer having a first side in face-sharing contact with the fabric layer and a second side in face-sharing contact with the compressible layer.

8. The layered insulation pack of claim 6, wherein each of the plurality of regularly spaced hexagonal perforations has a first diameter at a first side of the perforated layer, and each of the plurality of regularly spaced hexagonal perforation has a second diameter at a second side of the perforated layer, the first diameter greater than the second diameter.

9. The layered insulation pack of claim 6, wherein a wall between each of the plurality of regularly spaced hexagonal perforations has a first width at the first side of the perforation, and a wall between each of the plurality of regularly spaced hexagonal perforations has a second width at the second side of the perforation, the first width less than the second width.

10. The layered insulation pack of claim 2, wherein the insulation pack is in a non-compressed state when not worn by a wearer, and the insulation pack is in a compressed state when worn by the wearer, the compressible layer having a first thickness in the non-compressed state, and the compressible layer having a second thickness in the compressed state, the first thickness greater than the second thickness, the perforated air communication and retention layer having a third thickness in the non-compressed state, and the perforated air communication and retention layer having a fourth thickness in the compressed state, the third thickness greater than the fourth thickness, a difference between the first thickness and the second thickness greater than a difference between the third thickness and the fourth thickness.

11. The layered insulation pack of claim 10, wherein the compressible layer is partially disposed within the plurality of regularly spaced hexagonal perforations in the compressed state.

12. The layered insulation pack of claim 1, wherein the reflective layer is comprised of one of mylar, silver foil, or aluminum foil.

13. The layered insulation pack of claim 1, wherein the perforated layer is comprised of EVA.

14. The layered insulation pack of claim 1, wherein the compressible layer is comprised of one or more of compressed wool and woven wool.

15. A boot comprising:
   an upper connected to a sole, the upper and an inner surface of the sole forming an inner body space of the boot, the inner body space adapted to have a foot of a wearer positioned therein during wear of the boot, the sole including an outsole, a midsole, and an insole, an outer surface of the outsole being a ground contacting region of the boot, the outsole including a recess wherein the midsole is fitted, the midsole including a foam layer adhered to the outsole, an interface of the outsole and the foam layer forming an air tight seal, the midsole further including an insulation pack, the outsole and the foam layer having a recess wherein the insulation pack is flush with a lip of the recess, the insole disposed in the inner body space and attached to a lining of the upper, insole, midsole, and outsole in a compressed state when worn by the wearer and in a non-compressed state when not worn by the wearer, the insulation pack comprising:
      a honeycomb perforated layer including a plurality of air pockets within a plurality of hexagonal perforations, the plurality of perforations in air communication with the inner body space, the honeycomb perforated layer having a first durometer;

an insulating layer, the insulating layer adhered to and in face-sharing contact with the honeycomb perforated layer, the insulating layer having a network of fibers which are capable of holding air, the network of fibers in air communication with the plurality of hexagonal perforations, the insulating layer having a second durometer, the second durometer less than the first durometer, the insulating layer being more compressed than the honeycomb perforated layer in the compressed state; and a reflective layer, the reflective layer adhered to and in face-sharing contact with the foam layer at a first face of the reflective layer, the reflective layer adhered to and in face-sharing contact with the insulating layer at a second face of the reflective layer, wherein the insulating layer and the honeycomb perforated layer comprise a lofted air space to store air which passes into and out of the lofted air space from the inner body space during movement of the wearer.

16. The midsole of claim 15, wherein the insulation pack further includes a fabric layer, the fabric layer, the first fabric face adhered to and in face-sharing contact with the honeycomb perforated layer at a first face of the fabric layer, a second fabric face in face-sharing contact with the insole at a second face of the fabric layer.

17. The midsole of claim 15, wherein the insulating layer is partially disposed in the plurality of perforations in the compressed state.

18. The midsole of claim 15, wherein the insulating layer has a first thickness in the non-compressed state, and the insulating layer has a second thickness in the compressed state, the first thickness greater than the second thickness, and the honeycomb perforated layer has a third thickness in the non-compressed state, and the honeycomb perforated layer has a fourth thickness in the compressed state, the third thickness greater than the fourth thickness, a difference between the first thickness and the second thickness greater than a difference between the third thickness and the fourth thickness.

19. The midsole of claim 15, wherein the insulating layer is comprised of felt, the honeycomb perforated layer is comprised of EVA, and the reflective layer is comprised of mylar.

20. A footwear article insulation and heat retention system, comprising:

an insulation pack disposed on an internal side of an inner body space of the article, the inner body space adapted to have a foot of a wearer positioned therein during wear of the article, relative to a substantially air-tight seal on an external side of the inner body space, the insulation pack comprising, a perforated air communication and retention layer in air communication with the inner body space, the perforated air communication and retention layer including a plurality of hexagonal perforations in air communication with the inner body space, a compressible layer in air communication and face-sharing contact with the perforated air communication and retention layer, the compressible layer more compressible than the perforated air communication and retention layer, the compressible layer comprising a network of fibers which are capable of holding air, the network of fibers in air communication with the plurality of hexagonal perforations, the network of fibers and the perforated air communication and retention layer forming a lofted air space, the lofted air space storing air which passes into and out of the lofted air space from the inner body space during movement of the wearer, and a reflective layer in face-sharing contact with the compressible layer.

* * * * *